US009092033B1

(12) United States Patent
Walser et al.

(10) Patent No.: US 9,092,033 B1
(45) Date of Patent: Jul. 28, 2015

(54) EVENT SENSOR

(75) Inventors: Michael W. Walser, Comfort, TX (US); Kennon H. Guglielmo, San Antonio, TX (US); Kenneth R. Shouse, Fair Oaks Ranch, TX (US); Joseph Grogan, San Antonio, TX (US)

(73) Assignee: Enovation Controls, LLC, Tulsa, OK (US)

( * ) Notice: Subject to any disclaimer, the term of this patent is extended or adjusted under 35 U.S.C. 154(b) by 579 days.

(21) Appl. No.: 13/016,187

(22) Filed: Jan. 28, 2011

Related U.S. Application Data

(60) Division of application No. 11/903,208, filed on Sep. 19, 2007, and a continuation-in-part of application No. 11/056,848, filed on Feb. 11, 2005, now Pat. No. 7,229,330, and a continuation-in-part of application (Continued)

(51) Int. Cl.
 G05D 1/00 (2006.01)
 G05D 3/00 (2006.01)
(Continued)

(52) U.S. Cl.
 CPC ............... *G05D 1/0206* (2013.01); *G05D 1/02* (2013.01); *G01C 21/10* (2013.01); *G01C 21/16* (2013.01); *G01C 21/26* (2013.01); *G01C 23/00* (2013.01); *G05D 1/027* (2013.01)

(58) Field of Classification Search
 CPC ......... G05D 1/0206; G05D 1/02; G05D 1/00; G05D 1/027; G01C 21/10; G01C 21/20; G01C 21/203; G01C 21/26; G01C 21/16; G01C 21/165; G01C 23/00

USPC ......... 701/1, 21, 25, 300, 400, 408–413, 466, 701/468; 340/984, 988, 995.1, 995.14, 340/995.17–995.25, 995.27, 995.28
See application file for complete search history.

(56) References Cited

U.S. PATENT DOCUMENTS 3,748,466 A 7/1973 Sibley
4,392,122 A * 7/1983 Hocken ..................... 340/323 R
(Continued)

FOREIGN PATENT DOCUMENTS

JP H-1153700 A * 2/1999 ............... G08G 3/00
WO WO0129512 4/2001

OTHER PUBLICATIONS

Race Technology Speedbox 200Hz non-contact speed sensor brochure; Race Technology Ltd., Strelley Hall, Main Street, Nottingham, England NG8 6PE.
(Continued)

*Primary Examiner* — Jack W Keith
*Assistant Examiner* — Chuong P Nguyen
(74) *Attorney, Agent, or Firm* — Haynes and Boone, LLP; William B. Nash; Joseph R. Mencher

(57) ABSTRACT

An automatic timing measurement system provides a measure of time of passage of a watercraft through a prescribed course. Inertial or other estimates augmented by GPS speed/position measurements are used to track position of a watercraft, and those estimates are used to allow the locations of prescribed courses to be mapped and memorized. The apparatus may automatically detect passage of a watercraft through mapped courses for the purpose of measuring and reporting time of passage past key points in the course, and for modifying the behavior of the speed control of the apparatus if necessary at certain points in the mapped course. GPS speed control may be augmented with a secondary velocity measurement device that measures speed over water resulting in an optional user selectable real-time compensation for water current. Furthermore, GPS may be used as the key input to produce boat speed-based pull-up profiles.

20 Claims, 9 Drawing Sheets

Related U.S. Application Data

No. 11/811,616, filed on Jun. 11, 2007, now Pat. No. 7,494,393, and a continuation-in-part of application No. 11/811,605, filed on Jun. 11, 2007, now Pat. No. 7,491,104, and a continuation-in-part of application No. 11/811,606, filed on Jun. 11, 2007, now Pat. No. 7,485,021, and a continuation-in-part of application No. 11/811,604, filed on Jun. 11, 2007, now Pat. No. 7,465,203, and a continuation-in-part of application No. 11/811,617, filed on Jun. 11, 2007, now Pat. No. 7,494,394.

(51) Int. Cl.
  *G05D 1/02* (2006.01)
  *G01C 23/00* (2006.01)
  *G01C 21/10* (2006.01)
  *G01C 21/26* (2006.01)
  *G01C 21/16* (2006.01)

(56) References Cited

U.S. PATENT DOCUMENTS

| | | | |
|---|---|---|---|
| 4,422,423 A | 12/1983 | Sugiyama et al. | |
| 4,939,661 A | 7/1990 | Barker et al. | |
| 5,074,810 A | 12/1991 | Hobbs | |
| 5,110,310 A | 5/1992 | Hobbs | |
| 5,142,473 A | 8/1992 | Davis | |
| 5,276,660 A * | 1/1994 | Lee | 368/10 |
| 5,355,855 A | 10/1994 | Saikalis | |
| 5,367,999 A | 11/1994 | King et al. | |
| 5,369,589 A * | 11/1994 | Steiner | 701/538 |
| 5,404,341 A * | 4/1995 | Horiguchi | 368/110 |
| 5,416,712 A | 5/1995 | Geier et al. | |
| 5,458,104 A | 10/1995 | Tuckey | |
| 5,694,337 A * | 12/1997 | Macken | 700/91 |
| 5,700,171 A | 12/1997 | Horton | |
| 5,731,788 A * | 3/1998 | Reeds | 342/357.57 |
| 5,808,671 A | 9/1998 | Maycock et al. | |
| 5,828,979 A | 10/1998 | Polivka | |
| 5,828,987 A | 10/1998 | Tano | |
| 5,848,373 A | 12/1998 | DeLorme et al. | |
| 5,884,213 A * | 3/1999 | Carlson | 701/21 |
| 5,904,131 A | 5/1999 | O'Neill et al. | |
| 5,905,713 A | 5/1999 | Anderson et al. | |
| 6,041,762 A | 3/2000 | Sirosh et al. | |
| 6,041,765 A | 3/2000 | O'Neill et al. | |
| 6,076,042 A | 6/2000 | Tognazzini | |
| 6,131,552 A | 10/2000 | Paielli et al. | |
| 6,157,297 A | 12/2000 | Nakai | |
| 6,169,495 B1 | 1/2001 | Koike | |
| 6,176,224 B1 | 1/2001 | Wu et al. | |
| 6,227,918 B1 | 5/2001 | Wahrton | |
| 6,259,381 B1 | 7/2001 | Small | |
| 6,267,105 B1 | 7/2001 | Bertossi | |
| 6,273,771 B1 | 8/2001 | Buckley et al. | |
| 6,283,240 B1 | 9/2001 | Beever | |
| 6,289,277 B1 | 9/2001 | Feyereisen et al. | |
| 6,289,278 B1 | 9/2001 | Endo et al. | |
| 6,312,301 B1 * | 11/2001 | Kennedy | 441/68 |
| 6,340,005 B1 | 1/2002 | Keast et al. | |
| 6,353,781 B1 | 3/2002 | Spivak | |
| 6,389,333 B1 | 5/2002 | Hansman et al. | |
| 6,401,446 B1 | 6/2002 | Gibbons | |
| 6,456,910 B1 | 9/2002 | Roe | |
| 6,485,341 B1 | 11/2002 | Lanyl | |
| 6,507,785 B1 | 1/2003 | Stefan et al. | |
| 6,517,396 B1 | 2/2003 | Into | |
| 6,573,486 B1 | 6/2003 | Ratkovic | |
| 6,577,932 B1 * | 6/2003 | Van Beurden et al. | 701/21 |
| 6,643,580 B1 * | 11/2003 | Naimer et al. | 701/467 |
| 6,701,905 B1 | 3/2004 | Gaskins | |
| 6,722,302 B2 | 4/2004 | Matsuda et al. | |
| 6,748,325 B1 | 6/2004 | Fujisaki | |
| 6,763,226 B1 | 7/2004 | McZeal | |
| 6,779,752 B1 | 8/2004 | Ratkovic | |
| 6,826,478 B2 * | 11/2004 | Riewe et al. | 701/470 |
| 6,845,321 B1 | 1/2005 | Kerns | |
| 6,864,807 B2 | 3/2005 | Todoriki et al. | |
| 6,884,128 B2 | 4/2005 | Okuyama et al. | |
| 6,904,364 B2 | 6/2005 | Randazzo et al. | |
| 6,959,240 B2 * | 10/2005 | Okamoto | 701/70 |
| 7,027,808 B2 | 4/2006 | Wesby | |
| 7,031,224 B2 | 4/2006 | Reifer | |
| 7,047,114 B1 | 5/2006 | Rogers | |
| 7,143,130 B2 | 11/2006 | Lin | |
| 7,143,363 B1 | 11/2006 | Gaynor et al. | |
| 7,150,430 B2 | 12/2006 | Silansky | |
| 7,184,888 B2 | 2/2007 | Furukawa | |
| 7,214,110 B1 | 5/2007 | Ehlers et al. | |
| 7,229,330 B2 | 6/2007 | Walser et al. | |
| 7,236,426 B2 | 6/2007 | Turner et al. | |
| 7,344,377 B2 | 3/2008 | Bozicevic | |
| 7,354,321 B2 | 4/2008 | Takada | |
| 7,361,067 B1 | 4/2008 | Smedema | |
| 7,398,741 B2 | 7/2008 | Koda et al. | |
| 7,415,336 B1 | 8/2008 | Burch | |
| 7,465,203 B2 | 12/2008 | Walser et al. | |
| 7,485,021 B2 | 2/2009 | Walser et al. | |
| 7,491,104 B2 | 2/2009 | Walser et al. | |
| 7,494,393 B2 | 2/2009 | Walser et al. | |
| 7,494,394 B2 | 2/2009 | Walser et al. | |
| 7,841,440 B2 | 11/2010 | Liu | |
| 7,877,174 B2 | 1/2011 | Walser et al. | |
| 7,883,383 B2 * | 2/2011 | Larsson | 440/1 |
| 7,934,983 B1 | 5/2011 | Eisner | |
| 8,033,878 B2 * | 10/2011 | Shibayama et al. | 440/87 |
| 2001/0032236 A1 | 10/2001 | Lin | |
| 2001/0055063 A1 | 12/2001 | Nagai et al. | |
| 2002/0022927 A1 | 2/2002 | Lemelson | |
| 2003/0036814 A1 * | 2/2003 | Middleton | 700/91 |
| 2003/0050754 A1 | 3/2003 | Edwards et al. | |
| 2003/0060973 A1 | 3/2003 | Mathews et al. | |
| 2003/0135327 A1 | 7/2003 | Levine | |
| 2003/0158665 A1 | 8/2003 | McCall et al. | |
| 2004/0056779 A1 | 3/2004 | Rast | |
| 2004/0150557 A1 | 8/2004 | Ford | |
| 2004/0193334 A1 | 9/2004 | Carlsson et al. | |
| 2005/0075782 A1 | 4/2005 | Torgunrud | |
| 2005/0176312 A1 | 8/2005 | Walser et al. | |
| 2005/0191916 A1 * | 9/2005 | Bozicevic | 441/6 |
| 2005/0222933 A1 | 10/2005 | Wesby | |
| 2006/0038718 A1 | 2/2006 | Arakane | |
| 2006/0074540 A1 | 4/2006 | Braunberger | |
| 2006/0089794 A1 * | 4/2006 | DePasqua | 701/208 |
| 2006/0176216 A1 | 8/2006 | Hipskind | |
| 2008/0003899 A1 | 1/2008 | Walser | |
| 2008/0009205 A1 | 1/2008 | Walser | |
| 2008/0009206 A1 | 1/2008 | Walser | |
| 2008/0085642 A1 | 4/2008 | Guglielmo et al. | |
| 2008/0133131 A1 | 6/2008 | Poreda et al. | |
| 2010/0087110 A1 | 4/2010 | Berg | |

OTHER PUBLICATIONS

Mercury SmartCraft Operation Manual; This Manual Describes the SmartCraft Tachometer/Speedometer Gauge Systems; Copyright Mercury Marine, 90-898283015-907.
http://www.mercurymarine.com/otherproducts/smartcraft/smartcraftinaction/smarttow.php.
"Cruise and Tow with Consistent Control," Mercury SmartCraft DTS SmartTow brochure, copyright 2006 Mercury Marine.
"Understanding Smart Tow Profiles," Mercury SmartCraft DTS.
"Smart Tow Pro—The Next Wave in Tow Sport Technology," Mercury SmartCraft DTS Smart Tow Pro (GPS Precision) brochure, copyright 2008, Mercury Marine.
"Mercury Marine Launches Smart Tow Pro for DTS SmartCraft engines," Mercury News Release, Dec. 18, 2007.
"Power Trip, Hit It with Mercury's New Smart Two Speed Control," Doc Talk brochure.
Matching of ground-based LiDAR and aerial image data for mobile robot localization in densely forested environments; Hussein, M.;

(56) References Cited

OTHER PUBLICATIONS

Renner, M.; Watanabe, M.; Iagnemma, K.; Intelligent Robots and Systems (IROS), 2013 IEEE/RSJ International Conference on DOI: 10.1109/IROS.2013.6696537; Publication Year: 2013, pp. 1432-1437.

Modified Hopfield Neural Network Algorithm (MHNNA) for TSS mapping in Penang strait, Malaysia; Kzar, A.A.; MatJafri, M.Z.; Lim, H.S.; Mutter, K.N.; Syahreza, S.; Signal and Image Processing Applications (ICSIPA), 2013 IEEE International Conference on DOI: 10.1109/ICSIPA.2013.6708001; Publication Year: 2013; pp. 187-192.

Aesthetic value characterization of landscapes in coastal zones; Depellegrin, D.; Blazauskas, N.; Vigl, L.E; Baltic International Symposium (BALTIC), 2012 IEEE/OES; DOI: 10.1109/BALTIC.2012.6249166; Publication Year: 2012, pp. 1-6.

Queue detection using computer image processing; Hoose, N; Road Traffic Monitoring, 1989., Second International Conference on Publication Year: 1989, pp. 94-98.

Locating Subsurface Targets Using Minimal GPR Measurements; Gurbuz, A.C.; McClellan, J.H.; Scott, W.R.; Signal Processing and Communications Applications, 2006 IEEE 14th; DOI: 10.1109/SIU.2006.1659746; Publication Year: 2006; pp. 1-4.

Multi-UAV-based stereo vision system without GPS for ground obstacle mapping to assist path planning of UGV; Jin Hyo Kim; Ji-Wook Kwon; Jiwon Seo; Electronics Letters; vol. 50, Issue: 20; DOI: 10.1049/el.2014.2227; Publication Year: 2014; pp. 1431-1432.

Ship positioning by matching radar images and map data; Aytac, A.E.; Aksoy, O.; Akgul, Y.S.; Signal Processing and Communications Applications Conference (SIU), 2014 22nd; DOI: 10.1109/SIU.2014.6830506; Publication Year: 2014; pp. 1423-1426.

Pattern of life for radar port and river security; Silvious, J.; Tahmoush, D.; Homeland Security (HST), 2012 IEEE Conference on Technologies for; DOI: 10.1109/THS.2012.6459921; Publication Year: 2101; pp. 626-630.

"TerrLab—a genetic simulation and post-processing tool for terrain referenced navigation," Hagen, O.K.; Oceans 2006, Digital Object Identifier: 10.1109/OCEANS.2006.306834; Publication Year: 2006, pp. 1-7.

"Modal mapping in shallow water using synthetic aperture horizontal arrays," Frisk, et al.; Oceans 2000 MTS/IEEE Conference and Exhibition; vol. 1; Digital Object Identifier: 10.1109/OCEANS.2000.881258; publication year: 2000, pp. 185-188.

* cited by examiner

EVENT SENSOR

CROSS REFERENCE TO RELATED APPLICATIONS

This patent is a divisional of U.S. patent application Ser. No. 11/903,208 filed Sep. 19, 2007, which is a continuation-in-part patent application that claims priority and incorporates herein by reference U.S. patent application Ser. No. 11/056,848, now issued as U.S. Pat. No. 7,229,330; U.S. patent application Ser. No. 11/811,616, filed Jun. 11, 2007, now issued as U.S. Pat. No. 7,494,393; U.S. patent application Ser. No. 11/811,605 filed Jun. 11, 2007, now issued as U.S. Pat. No. 7,491,104; U.S. patent application Ser. No. 11/811,606, filed Jun. 11, 2007, now issued as U.S. Pat. No. 7,485,021; U.S. patent application Ser. No. 11/811,604, filed Jun. 11, 2007, now issued as U.S. Pat. No. 7,465,203; and U.S. patent application Ser. No. 11/811,617, filed Jun. 11, 2007, now issued as U.S. Pat. No. 7,494,394.

FIELD OF THE INVENTION

The present invention pertains to the field of water sports and boating and more specifically to electronic devices for use in water sports.

BACKGROUND OF THE INVENTION

Competitors in trick, jump, and slalom ski and wakeboard events require tow boats capable of consistent and accurate speed control. Successful completion of slalom and jump runs require passes through a competition water course at a precise specific speed. Competition rules usually require that said speed requirements be confirmed by use of a speed measurement system. For example, American Water Ski Association Three-Event Slalom and Jump competitions specify a required time window for completion of all segments of the course to confirm that speed was maintained adequately throughout the pass. These times have historically been measured either using manual stopwatch measurements or, more recently, using magnetic sensors which are triggered by the presence of magnets attached to buoys in the water in close proximity to the path of the tow boat at the required timing measurement points in the course. Course times have to be reported and logged for every individual pass in competition. Reliability of triggering the magnetic sensor, as well as maintenance of the magnets attached to the buoys has consistently caused major difficulties in running competitive 3-event competitions.

SUMMARY OF THE INVENTION

The present invention provides a consistent, maintenance free and accurate method of measuring time of passage of a tow boat and skier through courses such as those used for slalom and jump competitions without the need for magnets or other physical attachments to the course infrastructure. Global Positioning System (GPS) satellite technology is used to map and memorize the location of courses in a permanent memory within a computer system. The system is then able to recognize every time the tow boat passes through the course using continuously updated GPS position estimates. By interpolating between periodic position updates, the system can accurately estimate time of closest approach to the entry gate to the course, and subsequently track time to all points of interest down the course using either the same GPS position measurement technique, or by tracking displacement of the tow boat down the line of the course using other techniques such as integration of velocity to derive position displacement.

An automatic timing measurement system that provides a measure of time of passage of a watercraft through a prescribed course. Algorithms based on inertial or other estimates augmented by GPS speed/position measurements are used to track position of a watercraft. Said position estimates are used to allow the locations of prescribed courses to be mapped and memorized. Algorithms are then used to allow the apparatus to automatically detect passage of a watercraft through mapped courses for the purpose of measuring and reporting time of passage of said watercraft past key points in said course, and for modifying the behavior of the speed control portion of the apparatus if necessary at certain points in the mapped course. A measure of accuracy of driver steering can be provided along with the ability to automatically steer the watercraft through the course if "steer-by-wire" mechanism is available. GPS speed control is augmented with a secondary velocity measurement device that measures speed over water resulting in an optional user selectable real-time compensation for water current. Furthermore, GPS is used as the key input to produce boat speed-based pull-up profiles.

DETAILED DESCRIPTION OF THE PREFERRED EMBODIMENT

The present invention relates generally to electronic event detectors and more specifically to electronic event detectors for use with power boats.

Figure 1:
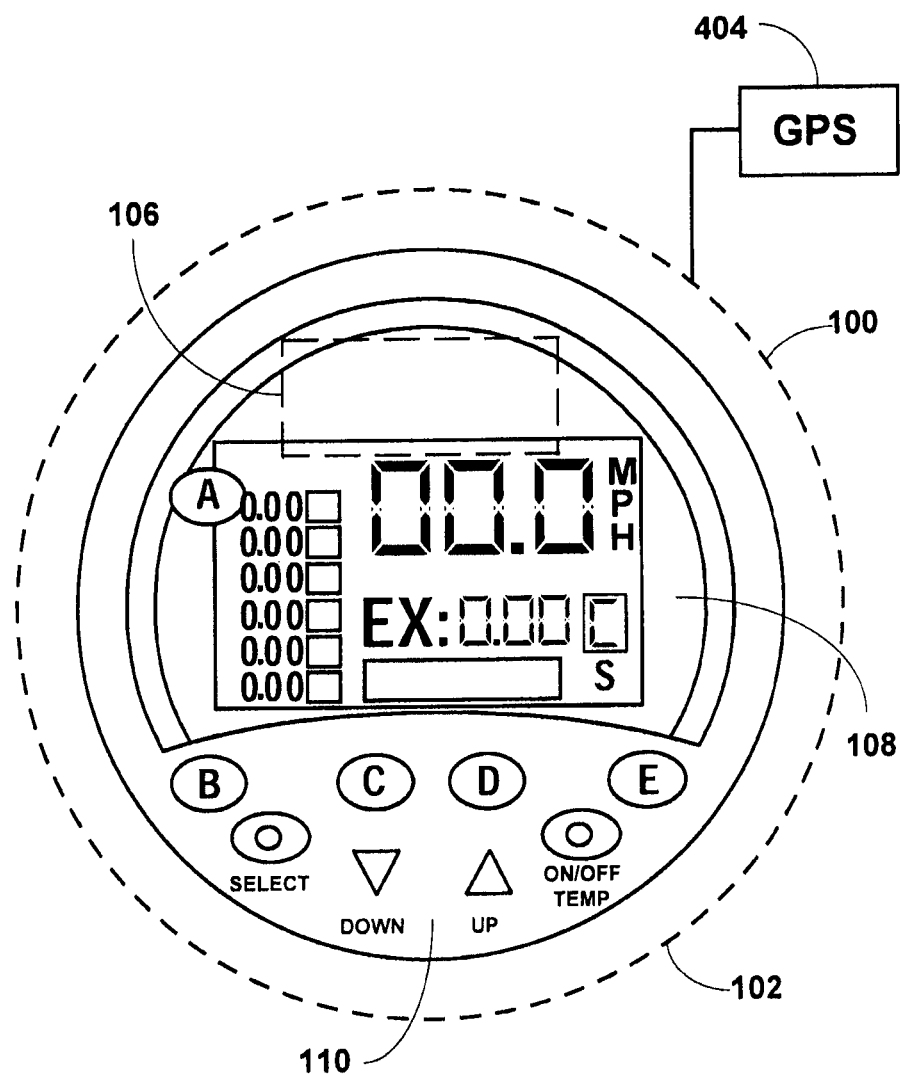
FIG. 1 is a perspective view of an embodiment of external housing of the device of the instant invention.

As show in FIG. 1, the event detector 100 of the present invention includes a housing 102 for housing the electronics of the invent detector an accelerometer 106 and a GPS 104. GPS 104 is preferably a unit separate from housing 102, e.g. a GARMIN® GPS 18-5 Hz.

Electronic housing 102 includes a display 108 and interface buttons 110. As will be appreciated by one skilled in the art the display 108 is preferably made out of moldable materials such as plastic, aluminum, glass, and the like, with a clear glass or plastic cover. Importantly, the housing is adapted to be waterproof to prevent damage to the electronics when in use. The display 108 may be a commercially available LCD display that is capable of displaying numbers or letters and information related to the event. User interface buttons 110 are actuators attached to the electronics covered in a rubberized membrane that allows buttons to remain waterproof during their actuation. The LCD display interface buttons 110 and glass cover are attached to an insulated housing 102 via e.g., screws, friction fit, adhesive, or the like inside the housing 102 are electronics, to be described below, that perform the functions of the device.

Figure 2:
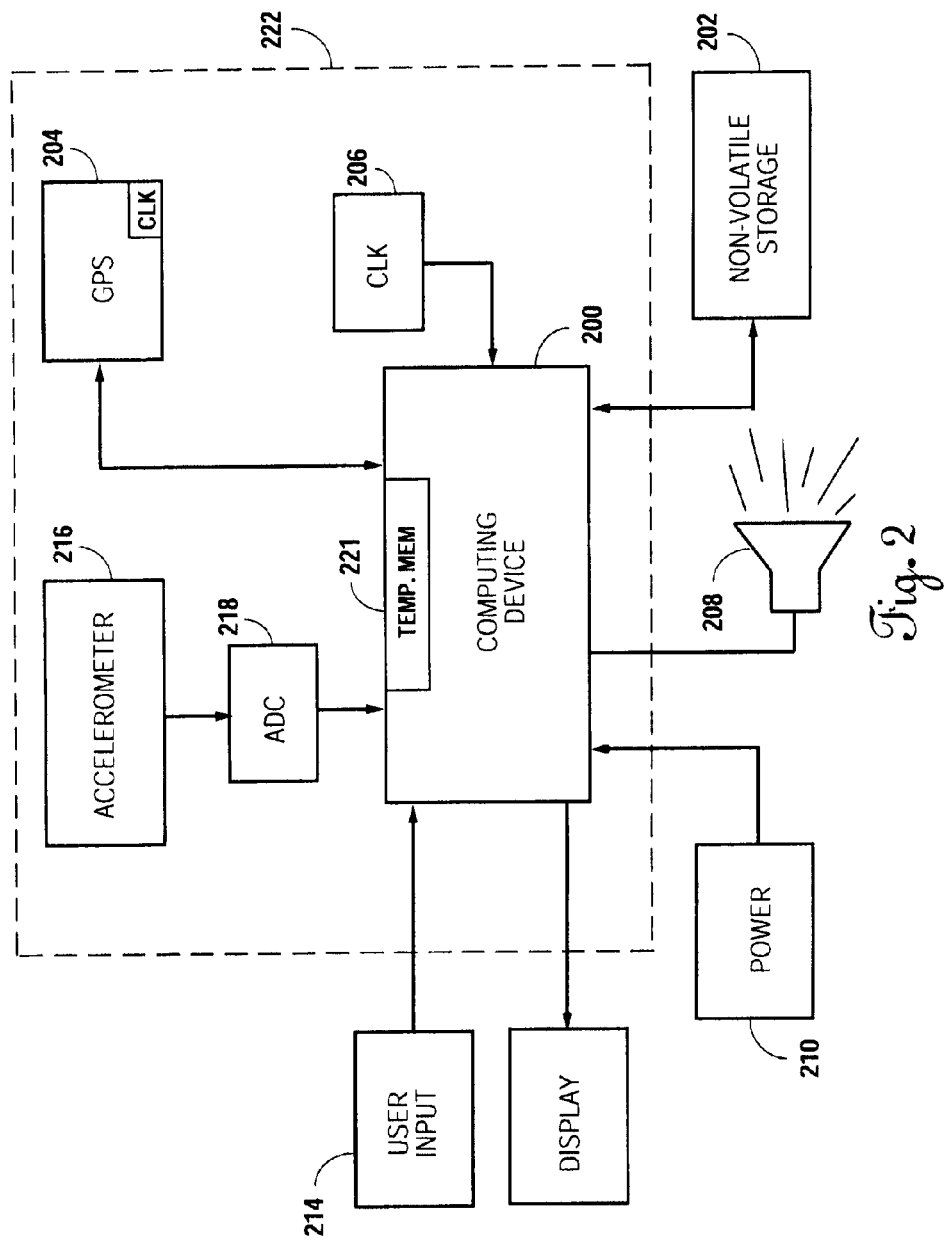
FIG. 2 is a block diagram of the electronics contained within the housing of FIG. 1.

The electronics will now be described with reference to FIG. 2. In general, the electronics of the event locator device 100 includes microprocessor 200, non-volatile storage 202, GPS interface 204, Clock 206, speaker 208, power device 210, user input interface 214, accelerometer 216, and analog-to-digital converter 218.

Microprocessor 200 is the "brains" of the invention and performs location calculations and timing data for output to a user. Preferably microprocessor 200 is capable of being externally programmed. Volatile storage 202 is connected to microprocessor 200 and stores event data such as map information, location information, and timing information for the microprocessor's calculations. Clock device 206 provides time data to the microprocessor 200 which can be displayed to a user. GPS interface 204 interfaces with the GPS system which provides location data to the microprocessor 200. Accelerometer 216 generates an acceleration signal and provides the same to the microprocessor 2000. AC/DC converter converts the signal from the accelerometer to a digital signal for input into the microcontroller 200. User input interface 214 is connected to the microprocessor and allows the user to program certain device settings into the non-volatile storage 202 such as map information, desired speed, and the like. Display 212 interacts with microprocessor to display event data speed, location and time information. Power supply 210 provides power to microcontroller and all of the associated electronics.

The general operation of microprocessor 200 will now be described in more detail with reference to FIG. 3. Note FIG. 3 contemplates a scenario where course mapping information is already saved in memory and accessible by the microprocessor. As is shown, the accelerometer receives a signal from the boat indicative of the boat's acceleration and inputs this signal to a microprocessor. The microprocessor converts the acceleration value into a velocity value in step 15 and in step 16 receives both the velocity information from the accelerometer and the velocity data from the GPS. As one skilled in the art will appreciate the velocity from a GPS is not updated continuously, and the velocity information from the accelerometer is used to provide resolution to the velocity information from the GPS system in step 17. An observed velocity is output at step 17, and in step 70 the velocity information and direction information obtained from the GPS system is used to calculate a latitude and longitude value for the accelerometer. In step 80, latitude and longitude information from the GPS system is compared to latitude and longitude information from the accelerometer. Much like step 17, the latitude and longitude information from the accelerometer is then used to attenuate the GPS signal. The microprocessor then outputs a latitude and longitude observed signal, which is used in reference to map data input by the user at the start of the process. When a preselected event occurs, as calculated by the comparison observed latitude/longitude signals the microprocessor outputs a sound signal to speaker 208 and a display signal to user display 108.

Collectively, the accelerometer 216, analog-to-digital converter 218, computing device 200, GPS unit 204, memory 221 and clock 206 comprise the elements of an observer 222. The observer 222 is adapted to act both as a velocity observer (in which it outputs an observed velocity) and as a position observer (in which it outputs an observed position). In the preferred embodiment of the present invention, an accelerometer acts as the primary source of data for computing displacements over time, with periodic updates from the GPS provided to account for drift in the accelerometer. But it will be appreciated by those skilled in the art that there are many other methods available for performing this task. For example, over-water velocity may be measured directly by means of a transducer such as a paddle wheel or a pitot tube, and those measurements may or may not be corrected with GPS inputs. In the case of direct velocity measurement, only a single integration with respect to time is needed to compute a new position. And, as GPS technology becomes more accurate and as new data are available at a higher frequency, it is conceivable that a GPS unit will provide the sole velocity and position inputs. Other configurations for measuring velocity and position will be apparent to those of ordinary skill in the art, and it is intended for this patent to encompass such additional configurations.

The specific software flow of the microprocessor programming will be described with reference to FIGS. 5 through 8.

Figure 5:
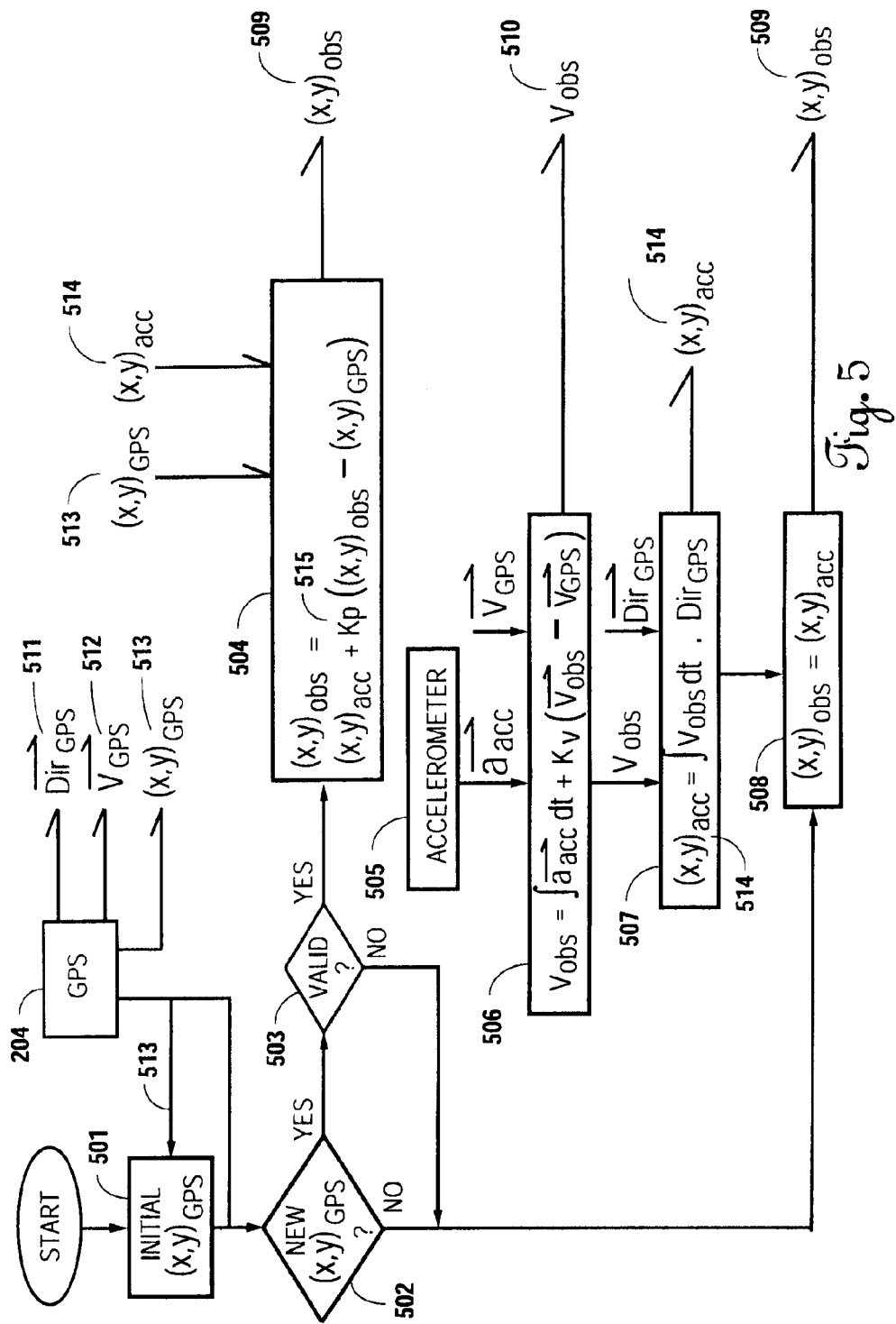
FIG. 5 is a flow diagram disclosing a method that an observer in accordance with a preferred embodiment of the present invention may use to determine observed velocity and observed position.

FIG. 5 discloses the functioning of a preferred embodiment of an observer 222. In step 501, a GPS signal is received from the GPS device 204. GPS device 204 provides a GPS position 513, a GPS velocity 512, and a GPS direction 511. Step 501 uses the GPS position as its initial starting position. In Step 502, there is a check to see if a new GPS position has been received. If a new GPS position has been received, in Step 503 it is checked to see if the GPS position is a valid GPS position. Step 503 compensates for the potential of invalid GPS signals such as occasionally occur in GPS devices known in the art. If the new GPS signal is a valid signal, then the observed position 509 is set to a value of the accelerometer corrected by the difference between the last observed position and the GPS position 513. A constant 515 is provided such as is calculated to provide the appropriate weight to the GPS measurement. For example, if constant 515 is set to one, then the GPS position is afforded its full weight. If constant 515 is set to a value less than one, the GPS is provided less weight, and it if it set to a value greater than one, the GPS is provided more weight. This constant is selected in accordance with the relative accuracies of the GPS and accelerometer such that for a more accurate GPS device, greater weight can be given to the GPS value and for a less accurate GPS device, less weight can be given to the GPS value. The result of this calculation is an observed position 509.

It is necessary to compensate for the 5 Hz resolution of the GPS device. This resolution is insufficient for the preferred embodiment of the present invention. So there is provided an alternative device, starting at step 505, which includes an accelerometer 316. The accelerometer provides a measured acceleration which is converted to a binary value in analog-to-digital converter 218. It is then useful for being compared to digital values provided by the GPS device 204. In step 506, an observed velocity is computed. The velocity is computed by first taking the last observed velocity 510 and the velocity provided by the GPS 512. This difference is adjusted by a velocity constant 517. As with position constant 515, velocity constant 517 is selected to compensate for the relative accuracy of the GPS device. The weighted difference is then added to the velocity computed by taking the first integral of the acceleration with respect to time, thereby providing a correction factor. In step 507, an accelerometer-computed position 514 is calculated. This position is computed by taking the integral of the velocity vector with respect to time. The displacement calculated thereby is adjusted to the direction signal provided by the GPS. This GPS correction step is used in the preferred embodiment because, in the interest of simplicity, the three-accelerometer is used only to compute acceleration along the single axis of the length of the boat. The result is accelerometer-computed position 514. The usefulness of accelerometer-computed position 514 is that it can be calculated at a frequency of approximately 1,000 hertz. So returning to step 502, if no new GPS signal has been provided, then the observed position is provided by the change in position as calculated by the accelerometer with no further input from the GPS device. Thus, there is provided from the observer an observed position 509 as well as an observed velocity 510.

Figure 8:
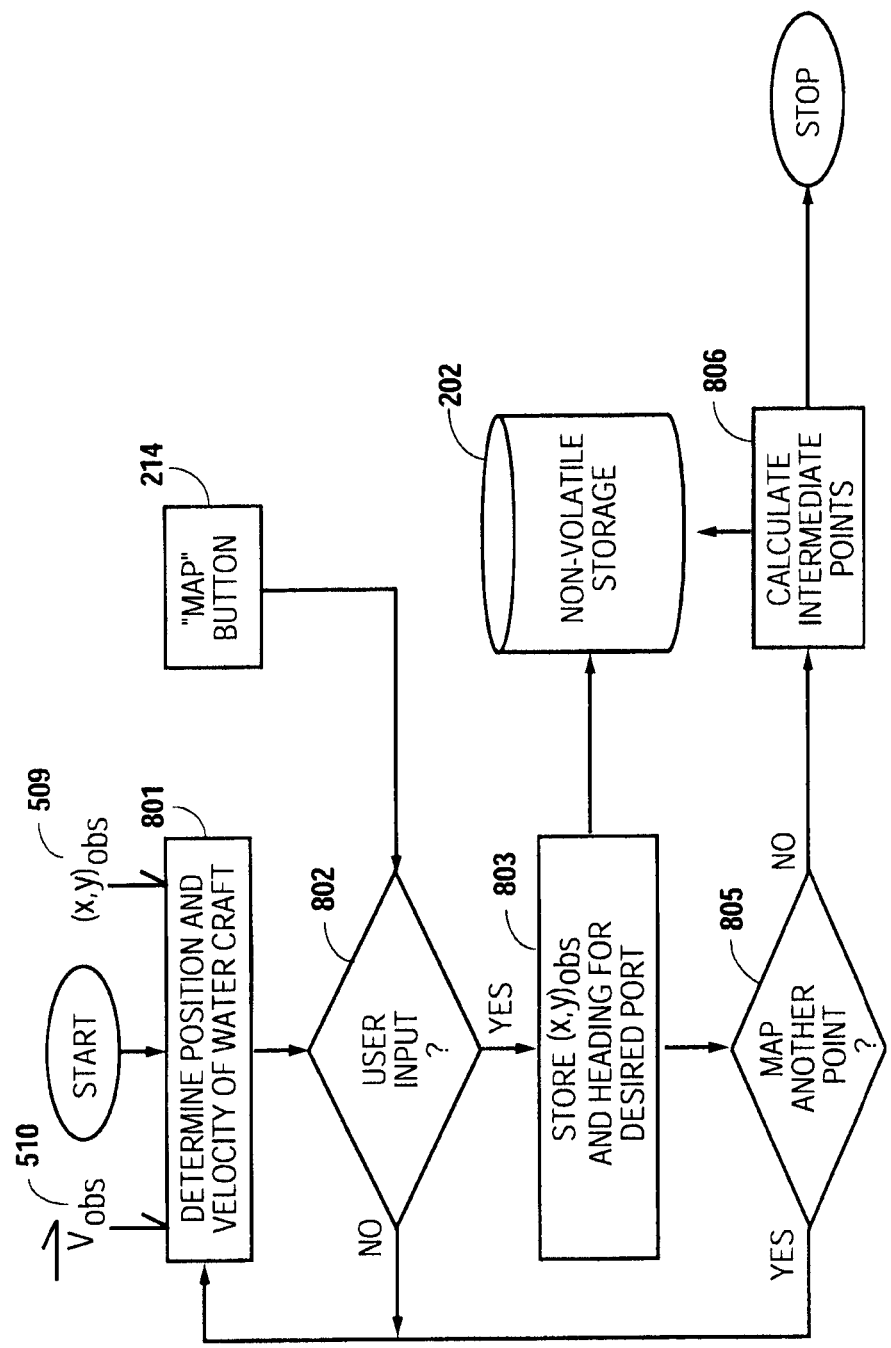
FIG. 8 is a flow diagram disclosing a method by which a user interactively "maps" a desired water course, and by which the present invention stores the mapped water course into non-volatile memory.

FIG. 8 discloses a method of using a watercraft equipped with a position and velocity observer, such as is described in FIG. 5, to map a competitive water course. In step 801, there is initial determination of the position and velocity of the watercraft as provided by the observed velocity 510 and the observed position 509. In step 802, there is a check to see whether there has been a user input from a map button 214. If no user input is provided, then the position observer continuously updates the position and velocity of the watercraft. Once there has been a user input at step 803, the current observed position 509 and the current heading are stored in non-volatile storage 202. In step 805, there is provided a step of checking to see if it is desired to map another point. If another point is to be mapped, then there is a return to step 801 and the method is repeated until, at step 805, there is no further point to mapped. When there is no further point to be mapped, at step 806, the device may calculate a number of predetermined intermediate points in between the points mapped and stored in step 803. These intermediate points are also stored in non-volatile storage 202.

Figure 6:
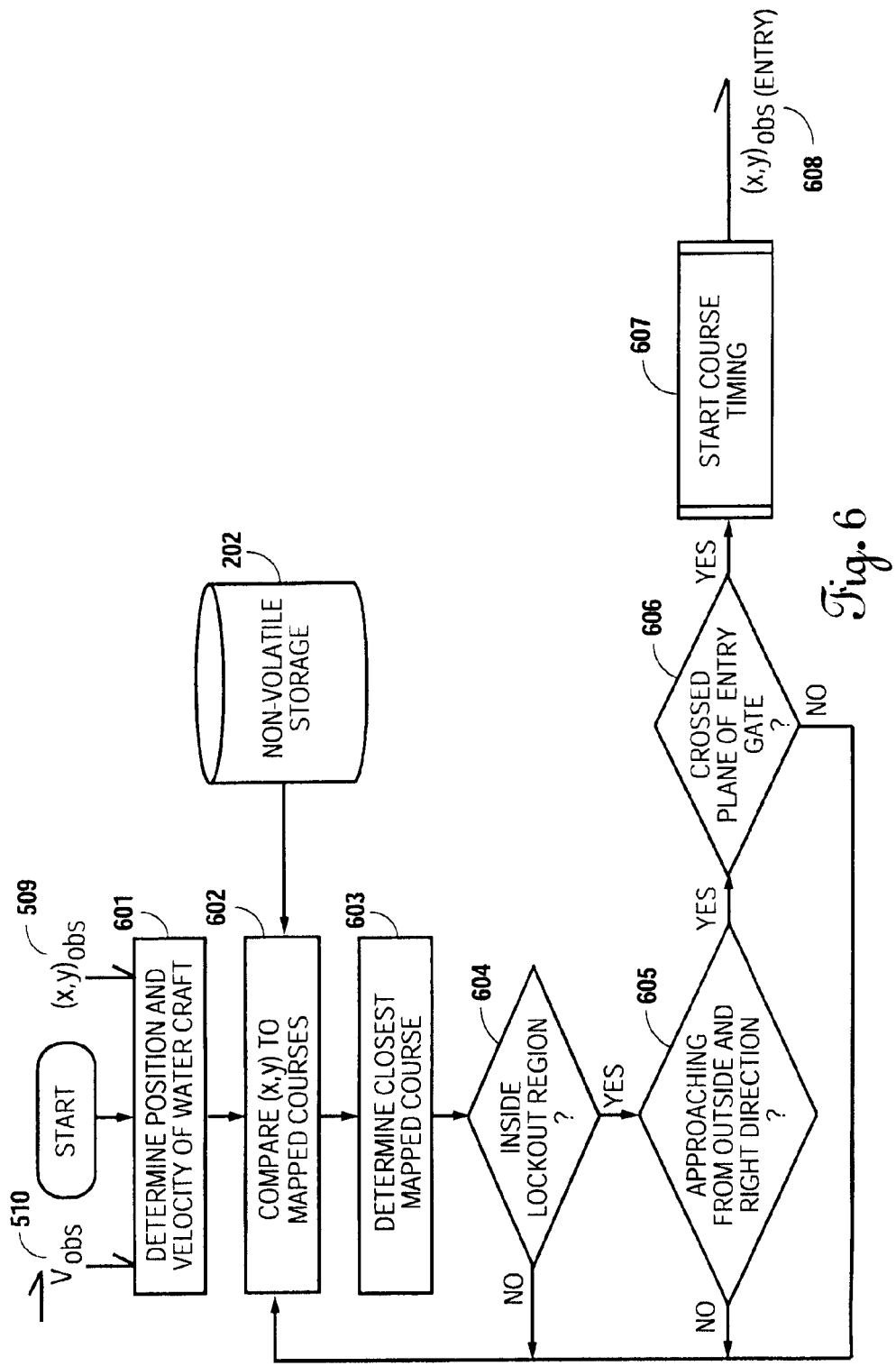
FIG. 6 is a flow diagram disclosing a method for automatically detecting a previously-mapped course.

In FIG. 6, there is disclosed a method of automatically detecting a course that has been mapped in accordance with the method of FIG. 8. At step 601, there is initial determination of position and velocity provided by observed position 509 and observed velocity 510. In step 602, compare the observed position 509 to a predetermined position as mapped in accordance with the method of FIG. 8. This mapped position is provided from non-volatile storage 202. In 603 there is a determination of which of a plurality of mapped courses as mapped in accordance with the method of FIG. 8 is the closest to the present observed position 509. Once a closest course has been locked in, then, in step 604, there is a check to see whether the watercraft is inside the lockout region of the closest water course. If the craft is within the lockout region, then there is also a check to see whether the craft is approaching from outside the course and is proceeding in the right direction along the center line of the course. If these criteria are not met, then continue looking for entrance into a course. If the criteria are met, then, in step 606, check to see whether the craft has crossed the plane of the entry gate of the course. If it has not, then return to step 602, continuing looking for entry to a course. If the criteria are met, then the craft has entered a mapped course and the course timing algorithm will automatically begin in step 607. This provides an observed position at the entry point 608.

Figure 7:
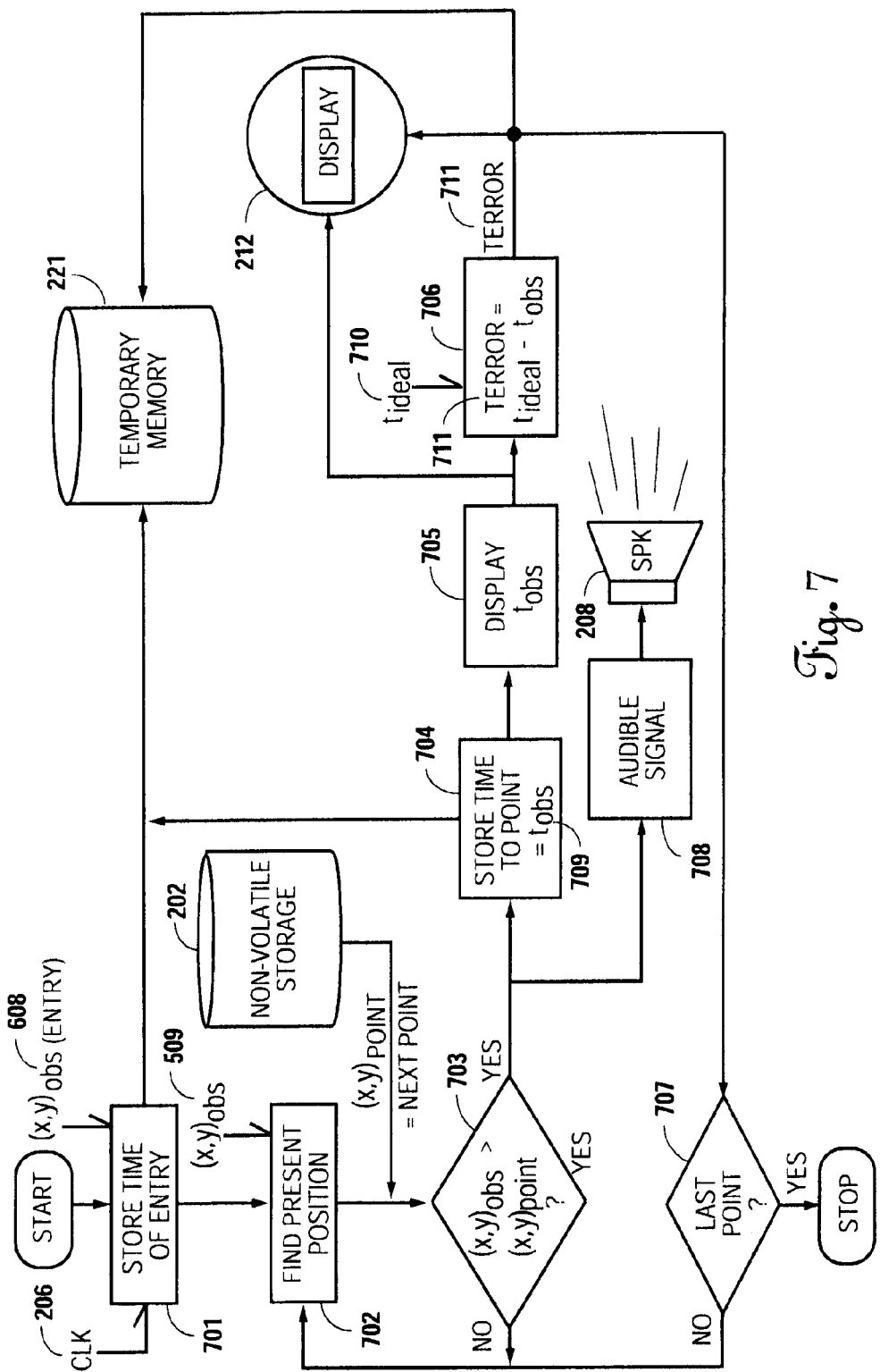
FIG. 7 is a flow diagram disclosing a method of detecting and reporting the time at which a plurality of events is detected.

In FIG. 7 there is disclosed a method for computing total time and intermediate times through a competitive water course. There is provided an observed position at the entry point 608 and there is also provided a clock signal 206. In step 701, the time at the entry point is recorded in temporary memory 221. In step 702, an observed position 509 is provided and this provides the present position of the watercraft. A plurality of points of interest are stored in non-volatile storage 202. In step 703, a point of interest is provided and there is a check to see if the current observed position 509 exceeds the position of the point of interest. If the present position 509 does not exceed the position of the point of interest, then the loop is continued until the present observed position exceeds the position of the point of interest. At this point, in step 704, the present observed time 709 is recorded into temporary memory 221 and, in step 705, the current observed time 709 is displayed on user display 212. In step 706, there is provided an ideal time 710. An error time 711 is computed as the difference between the ideal time 710 and the observed time 709. The error time 711 is also stored in temporary storage 221 and displayed on user display 212.

In a parallel process to step 704, when a point of interest is reached, there is also provided an audible signal through a speaker 208 to provide an audible indication to the user that this point has been passed. After steps 704, 705, 706 and 708 are completed, then in step 707 there is a check to see if this is the last point of interest. If it is not, then there is a return to step 702. If this is the last point of interest, the process ends.

The use of the device will now be described with respect to FIGS. 3, 4 and 9.

Figure 3:
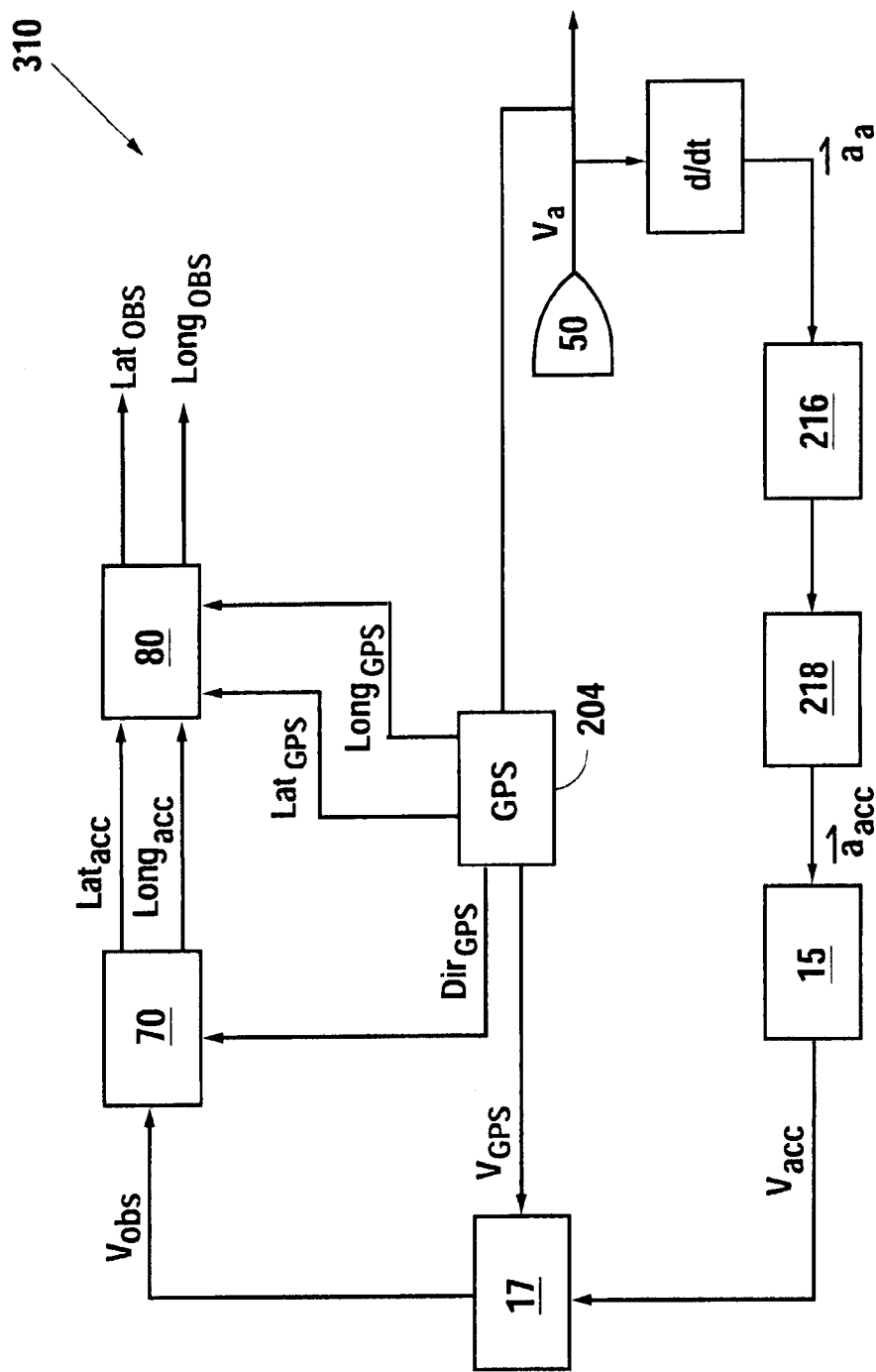
FIG. 3 is a feedback control loop diagram demonstrating the operation of an observer in accordance with a preferred embodiment of the present invention.

As diagrammed in FIG. 3 showing feedback system 310, the inertia measurement device (accelerometer) 216 measures the actual acceleration $a_a$ of a watercraft 50 and the GPS device 204 measures the actual velocity $v_a$ and position of the same watercraft 50. The output from the accelerometer $a_{Acc}$ is input into a first step 15 that coverts $a_{Acc}$ to velocity $V_{Acc}$. The output from first step 15 $v_{Acc}$ and the GPS output $v_{GPS}$ are input to a second step 17. The output from a second step 17 $v_{OBS}$ and the output ($Dir_{GPS}$) indicating course or direction of travel from the GPS device 204 are input into a third step 70 to derive inertial-based estimates of the latitude ($Lat_{Acc}$) and longitude ($Long_{Acc}$ of the watercraft 50. Direct GPS measurements of latitude ($Lat_{GPS}$) and longitude ($Long_{GPS}$) and the outputs from the third step 70 are input in a fourth step 80 to correct inertial-based estimates of the latitude ($Lat_{Acc}$) and longitude ($Long_{Acc}$) of the watercraft 50 to account for any inaccuracies due to drift or acceleration sensor inaccuracies. $Lat_{OBS}$ and $Long_{OBS}$ can then be used to allow the boat driver to record via a user interface the absolute latitude and longitude position coordinates of a course to be saved into a permanent non-volatile memory. Coordinates can be recorded either by direct numerical entry of measured coordinates, or by snapshotting course coordinates as the boat is maneuvering through the course to be mapped. The driver can identify course reference points via a user interface (not shown) or button press as the boat passes the point to be mapped. Since all courses of interest are laid out in straight lines, mapping of two known points in a course is sufficient to fully define the locations of all points of interest in a course and it's direction relative to earth latitude and longitude coordinates. All future passages of the towboat within a specified distance of selected course coordinates as measured by $Lat_{OBS}$ and $Long_{OBS}$ can then be detected and used to initiate timing measurements of the towboat through the mapped course.

Figure 9:
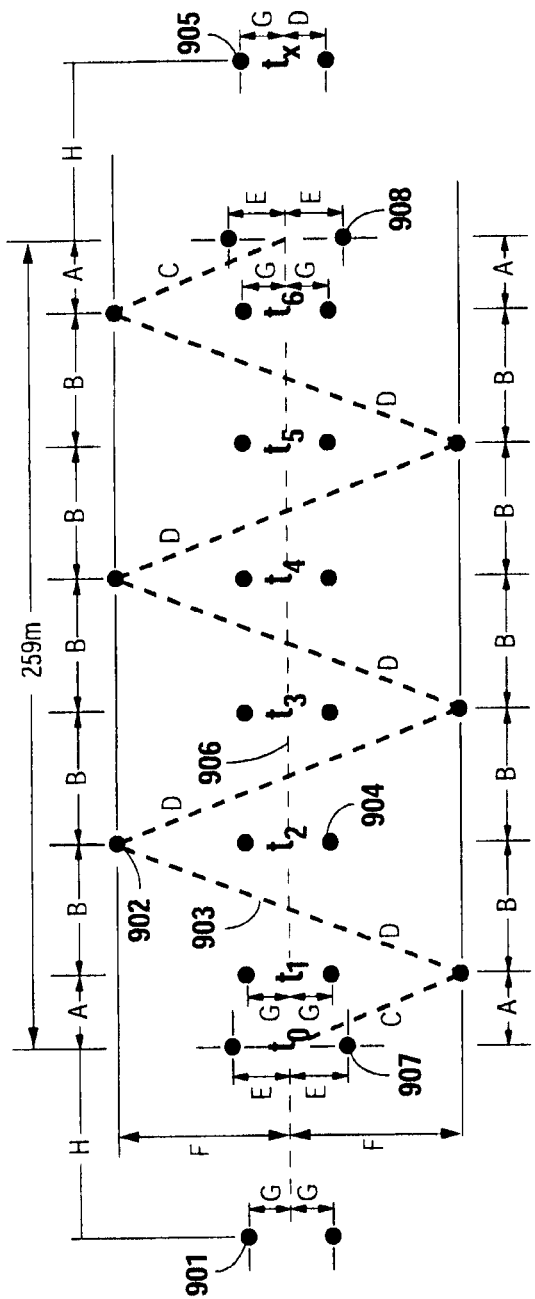
FIG. 9 is an example of a competitive slalom ski course.

FIG. 9 discloses a competitive slalom ski course. This is the type of course on which an embodiment of the present invention may be used. There is shown an entry gate 901, which can be characterized by a precise global coordinate specified in latitude and longitude. The opposite end point of the course is exit gate 905, which may also be characterized as a latitude and longitude. Because the course lies along a substantially straight line, the locations of all points of interest along the course can be found given the positions of the two end points.

A course centerline 906 lies along a substantially straight line and is slightly larger than the width of a water craft. The centerline is defined by boat buoys 904, which the water craft must stay in between. There are also provided ski buoys 902, which the skier must ski around during the passage of the course, in an alternating pattern as shown by the ski path 903. The skier must pass between the buoys defining first break point 907 before proceeding along ski path 903. At the end of the course is a second break point 908. The skier must ski between the two buoys defining second break point 908 after passing around the last buoy 902. In between these points are six intermediate points 904, each defined by a pair of buoys, which are positioned to be substantially collinear with the ski buoys 902.

The entry gate 901, exit gate 905, break points 907 and 908 and intermediate buoys 904 are all points of interest whose passage may need to be detected. The time at which the boat 50 passes these points may be used to determine whether a run is valid, according to whether the time is within an allowable margin of error. Because these points are defined according to precisely-surveyed distances, their locations can be detected by a substantially accurate observer (such as is provided by the preferred embodiment of the present invention) given only the location of the two end points. So the mapping course-mapping method described in FIG. 8 provides the observer with sufficient information to determine when a point of interest has been passed in accordance with the method of FIG. 7.

Once a course has been mapped, the location of the course can be stored in a permanent storage medium 202 such as a disk drive or flash memory. Further qualification of valid entry to a course can then be carried out based on GPS direction measurements so that timing measurements are only made when the towboat enters a mapped course while traveling along the known direction of the course centerline. Further, any deviations of the tow boat from the center line of the course can be detected and factored geometrically into the measurement of displacement down the centerline of the course so that errors in timing measurement due to driver steering error can be compensated for.

Figure 4:
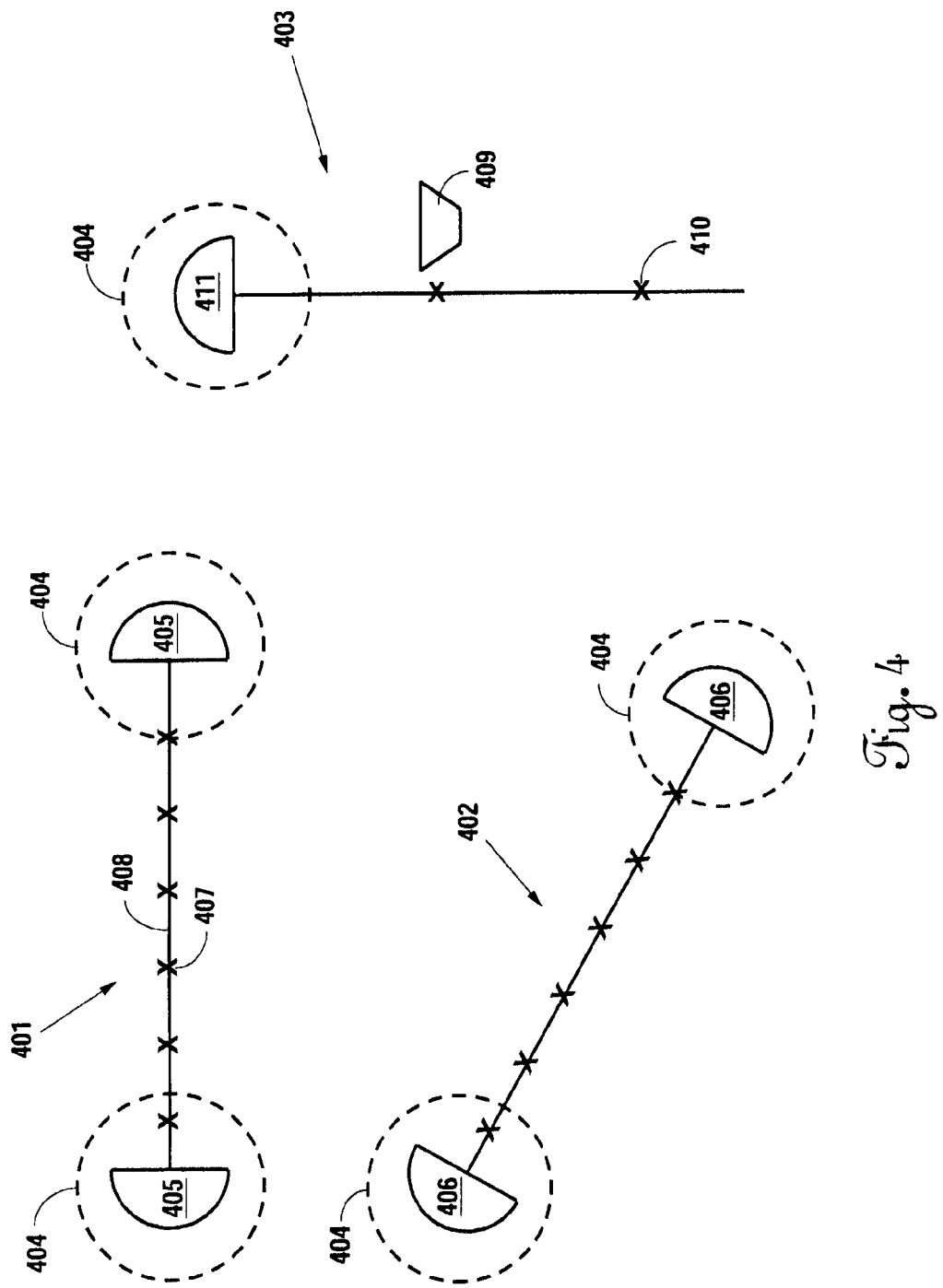
FIG. 4 is a diagram of an example water body including three ski courses.

FIG. 4 discloses a water course with a plurality of competitive ski courses. There is disclosed a first slalom course 401, a second slalom course 402 and a jump course 403. First slalom course 401 has entry and exit thresholds 405. Second slalom course 402 has entry and exit thresholds 406. The slalom courses may be traversed in either direction through entry and exit thresholds 405 and 406. A jump course 403 may be entered only through entry threshold 411 because ski jump 409 is unidirectional.

According to a preferred embodiment of the present invention, a user may approach a course, for example first slalom course 401. Upon entering the entry threshold 405 in the direction of the course centerline 408, the user will press a button whereby the computing device is alerted of the location of the entry/exit threshold. The user then proceeds along course centerline 408 and presses a button again at the opposite entry/exit threshold 405.

The computing device also interfaces with a permanent storage medium. This storage medium contains the desired locations of intermediate buoys 407, which are located at pre-determined distances from the entry/exit buoys. "This process" allows the computing device to learn the exact location of first slalom course 401. "The process" can then be repeated to allow the computing device to learn the locations of second slalom course 402 and jump course 409.

Once the computing device has learned the locations of courses 401, 402 and 403, it is desirable for the device to automatically detect which course it is at without further user intervention. So there are shown mapped lockout regions 404 around each of the entry/exit thresholds 405, 406 and 411. According to the method disclosed in FIG. 6, the device will detect which of the mapped courses is closest to its present position. The device may also selectively detect only courses of a specific type (jump or slalom) depending on its current mode of operation. If the device then determines it is within a lockout regions 404, it will check to see if the boat is approaching from outside the entry/exit threshold and in the correct direction along the course centerline. If these criteria are met, then the device will calculate the time of the closest approach to the plane of the entry gate. At that time it will begin timing the path without any intervention from the user.

Because the locations of intermediate buoys 407 are pre-programmed, the device may provide an audible or visual indication of the passing of each intermediate buoy 407. It may also provide intermediate times at the passing of each intermediate buoy 407. Finally, it will calculate the time at which boat 50 passes through the opposite entry/exit threshold 405.

In this manner the device can automatically time a pass through a memorized course without any further intervention from the user.

A driver score can also be provided based on the degree of this error which can be used to rate driver performance and confirm accuracy of the boat path through the course, which is also a criterion used in judging whether a competitive pass is valid.

Any boat speed or engine torque modification requirements which may depend on position in the course can be triggered based on $Lat_{OBS}$ and $Long_{OBS}$ relative to the mapped course location.

As one skilled in the art will recognize, the device of the invention is one of the category of commonly understood instruments that measures an object's acceleration. The velocity of on object can be calculated by integrating the acceleration of an object over time. Further, the position of an object relative to a known starting point can be calculated by integrating the velocity of an object over time. A GPS device is one of the category of commonly understood instruments that use satellites to determine the substantially precise global position and velocity of an object. Such position and velocity measurements can be used in conjunction with timers to determine an object's instantaneous velocity and average velocity between two points, along with its absolute position at any point in time. A comparator is any analog or digital electrical, electronic, mechanical, hydraulic, or fluidic device capable of determining the sum of or difference between two input parameters, or the value of an input relative to a predetermined standard. An algorithm is any analog or digital electrical, electronic, mechanical, hydraulic, or fluidic device capable of performing a computational process. The algorithms disclosed herein can be performed on any number of computing devices commonly called microprocessors or microcontrollers, examples of which include the Motorola® MPC555 and the Texas Instruments® TMS320.

Use of observed velocity and position estimates based on inertial or other measurement sources allows for error correction of occasional glitches or interruptions in availability of accurate GPS velocity and position measurements. These can occur in the course of normal operations, either due to GPS antenna malfunction, or temporary loss of GPS satellite visibility due to overhead obstruction from bridges or overhanging vegetation and the like.

Other embodiments of the system could include automated steering of the boat down the centerline of the course making use of course location information stored as described in 0014 thru 0016 above. The present invention may be included as part of an electronic closed-loop feedback system that controls the actual angular velocity $\omega_a$ of a boat propeller, and, indirectly, the actual over land velocity $V_a$ of the watercraft propelled by that propeller.

Another embodiment allows the apparatus to track the position of a skier behind the watercraft as he/she traverses the course. This can be achieved by mounting a GPS antenna somewhere on or near the body of the skier and capturing these data concurrently with data from a tow boat mounted antenna. Such GPS antennae can be either wired or wirelessly connected to the main apparatus.

It will be apparent to those with ordinary skill in the relevant art having the benefit of this disclosure that the present invention provides an apparatus for tracking the position and velocity of a watercraft through a prescribed course without the need for measurement aids such as magnets built into the course infrastructure. It is understood that the forms of the invention shown and described in the detailed description and the drawings are to be taken merely as presently preferred examples and that the invention is limited only by the language of the claims. The drawings and detailed description presented herein are not intended to limit the invention to the particular embodiments disclosed. While the present invention has been described in terms of one preferred embodiment and a few variations thereof, it will be apparent to those skilled in the art that form and detail modifications can be made to that embodiment without departing from the spirit or scope of the invention.

We claim:

1. A system for measuring steering accuracy through a water course, comprising:
    a position observer subsystem;
    a timing measurement device;
    a computing device in communication with the position observer subsystem and the timing measurement device; and
    a non-volatile storage coupled to the computing device and including locational information describing a preferred path of a mapped water course;
    wherein the computing device is configured to receive an observed position and an observed velocity of a watercraft from the position observer subsystem, compare the observed position and the observed velocity with the locational information describing the preferred path of the mapped water course to determine a deviation of the watercraft from the preferred path, and use the deviation to compensate for an error in a time measurement that is received from the timing measurement device and that measures an elapsed time between a plurality of points in the mapped water course.

2. The system of claim 1, wherein the preferred path of the mapped water course comprises a centerline of the mapped water course.

3. The system of claim 1, wherein the time measurement is a time period to complete the mapped water course.

4. The system of claim 1, wherein the using the deviation to compensate for the error in the measurement received from the timing measurement device includes the deviation resulting from the watercraft being steered away from the preferred path.

5. The system of claim 1, wherein the deviation of the watercraft from the preferred path comprises a distance deviation.

6. The system of claim 1, wherein the computing device is adapted to determine a driver score related to the deviation of the watercraft from the preferred path.

7. The system of claim 1, wherein the computing device is adapted to measure a displacement of the watercraft along the preferred path.

8. The system of claim 7, wherein the computing device is configured to factor the deviation of the watercraft from the preferred path into the measured displacement of the watercraft along the preferred path.

9. The system of claim 1, wherein the preferred path of the mapped water course is related to a the plurality of points in the mapped water course.

10. The system of claim 9, wherein the plurality of points include an entry point, an exit point, and at least one intermediate point.

11. A system for measuring steering accuracy through a water course, comprising:
    a Global Positioning System (GPS) device configured to provide a plurality of GPS information related to a watercraft;
    an accelerometer configured to provide a watercraft acceleration of the watercraft;
    a timing measurement device configured to measure a time period;
    a permanent storage medium configured to include locational information describing a preferred path of a water course; and
    a computing device coupled to the GPS device, the accelerometer, the time measurement device, and the permanent storage medium, wherein the computing device is configured to receive and use the GPS information, the watercraft acceleration, and the locational information to determine a deviation of the watercraft from the preferred path, and use the deviation to compensate for an error in a time period that is received from the timing measurement device and that includes an elapsed time between a plurality of points in the mapped water course.

12. The system of claim 11, wherein the time period is associated with the completion of the water course.

13. The system of claim 11, wherein the using the deviation to compensate for the error in the time period received from the timing measurement device includes the deviation resulting from the watercraft being steered away from the preferred path.

14. The system of claim 11, wherein the deviation of the watercraft from the preferred path comprises a distance deviation.

15. The system of claim 11, wherein the computing device is configured to measure a displacement of the watercraft along the preferred path.

16. The system of claim 15, wherein the computing device is configured to factor the deviation of the watercraft from the preferred path into the measured displacement of the watercraft along the preferred path.

17. The system of claim 11, wherein the preferred path of the mapped water course comprises a centerline of the mapped water course.

18. A steering accuracy measurement system, comprising:
    an accelerometer;
    a Global Positioning System (GPS) unit;
    a time measurement device;
    a permanent storage medium;

a computing device coupled to the accelerometer, the GPS unit, the time measurement device, and the permanent storage medium, wherein the computing device is configured to:

receive a observed position of the watercraft determined using the GPS unit;

compare the observed position of the watercraft to information retrieved from the permanent storage medium that describes a preferred path of a mapped water course;

determine a deviation of the watercraft from the preferred path based on the comparison of the observed position and the information describing the preferred path;

receive a time measurement from the timing measurement device that measures an elapsed time between a plurality of points in the mapped water course; and compensate for an error in the time measurement using the deviation.

19. The system of claim 18, wherein the computing device is configured to factor the deviation of the watercraft from the preferred path into a measured displacement of the watercraft along the preferred path.

20. The system of claim 18, wherein the time measurement is a time period required to complete the water course.

* * * * *